United States Patent [19]

Bobert

[11] Patent Number: 5,610,664
[45] Date of Patent: Mar. 11, 1997

[54] TELETEXT RECEIVER

[75] Inventor: Martin Bobert, Wailblingen, Germany

[73] Assignee: Sony Wega Produktions GmbH, Fellbach, Germany

[21] Appl. No.: 332,774

[22] Filed: Nov. 1, 1994

[30] Foreign Application Priority Data

Mar. 11, 1993 [EP] European Pat. Off. ............. 93117836

[51] Int. Cl.$^6$ .................................................. H04N 5/445
[52] U.S. Cl. ........................ 348/564; 348/468; 348/565; 348/569
[58] Field of Search ...................... 348/468, 569, 348/589, 565–568, 563, 564, 584, 600, 473, 476, 478, 596; 358/183, 22, 22 PP, 147; H04N 7/087, 5/445, 5/45, 9/74

[56] References Cited

U.S. PATENT DOCUMENTS

| | | | |
|---|---|---|---|
| 4,701,794 | 10/1987 | Fröling et al. | 348/468 |
| 4,954,882 | 9/1990 | Kamemoto | 348/468 |
| 4,998,171 | 3/1991 | Kim | 348/565 |
| 5,023,721 | 6/1991 | Moon-Hwan. | |
| 5,128,766 | 7/1992 | Choi. | |

FOREIGN PATENT DOCUMENTS

| | | |
|---|---|---|
| 0304129A2 | 2/1989 | European Pat. Off. . |
| 0394862A2 | 10/1990 | European Pat. Off. . |
| WO91/19384 | 12/1991 | European Pat. Off. . |
| 0489387A2 | 6/1992 | European Pat. Off. . |
| 0561028A1 | 9/1993 | European Pat. Off. . |
| 57-206178 | 12/1982 | Japan . |
| 61-105190 | 5/1986 | Japan . |
| 61-193580 | 8/1986 | Japan . |
| 1-276977 | 11/1989 | Japan . |
| 1-296879 | 11/1989 | Japan . |
| 1-296878 | 11/1989 | Japan . |
| 2-228186 | 9/1990 | Japan . |

*Primary Examiner*—Sherrie Hsia
*Attorney, Agent, or Firm*—William S. Frommer; Alvin Sinderbrand

[57] ABSTRACT

A teletext receiver has a television signal input circuit for receiving a television signal including teletext data signals. A teletext signal processor decodes the teletext data signals and obtains teletext data which is stored in a teletext memory. A teletext picture according to the stored teletext data is displayed at half size on one half of a display screen by reading out the teletext data from the memory at twice the speed normally used for displaying the teletext picture on the full screen. The teletext signal processor decodes teletext data for two pages which are displayed on the screen. Pages with numbers are identified in one of the two pages displayed on half the screen of the display, and if any one of these page numbers is selected, the teletext picture of the selected page is displayed on the other half of the screen. The teletext receiver may further comprise a picture in picture processor for generating video picture of smaller size than half of the screen size, and the display displays the small size video picture on the other half of the screen.

4 Claims, 5 Drawing Sheets

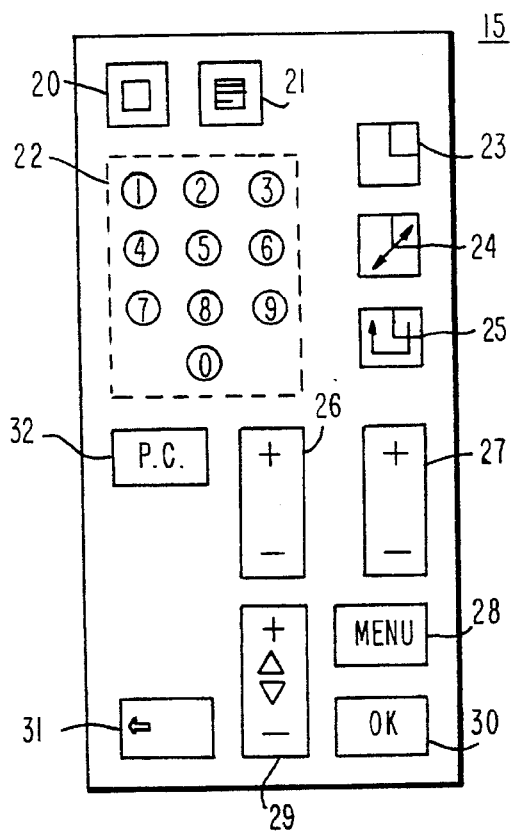

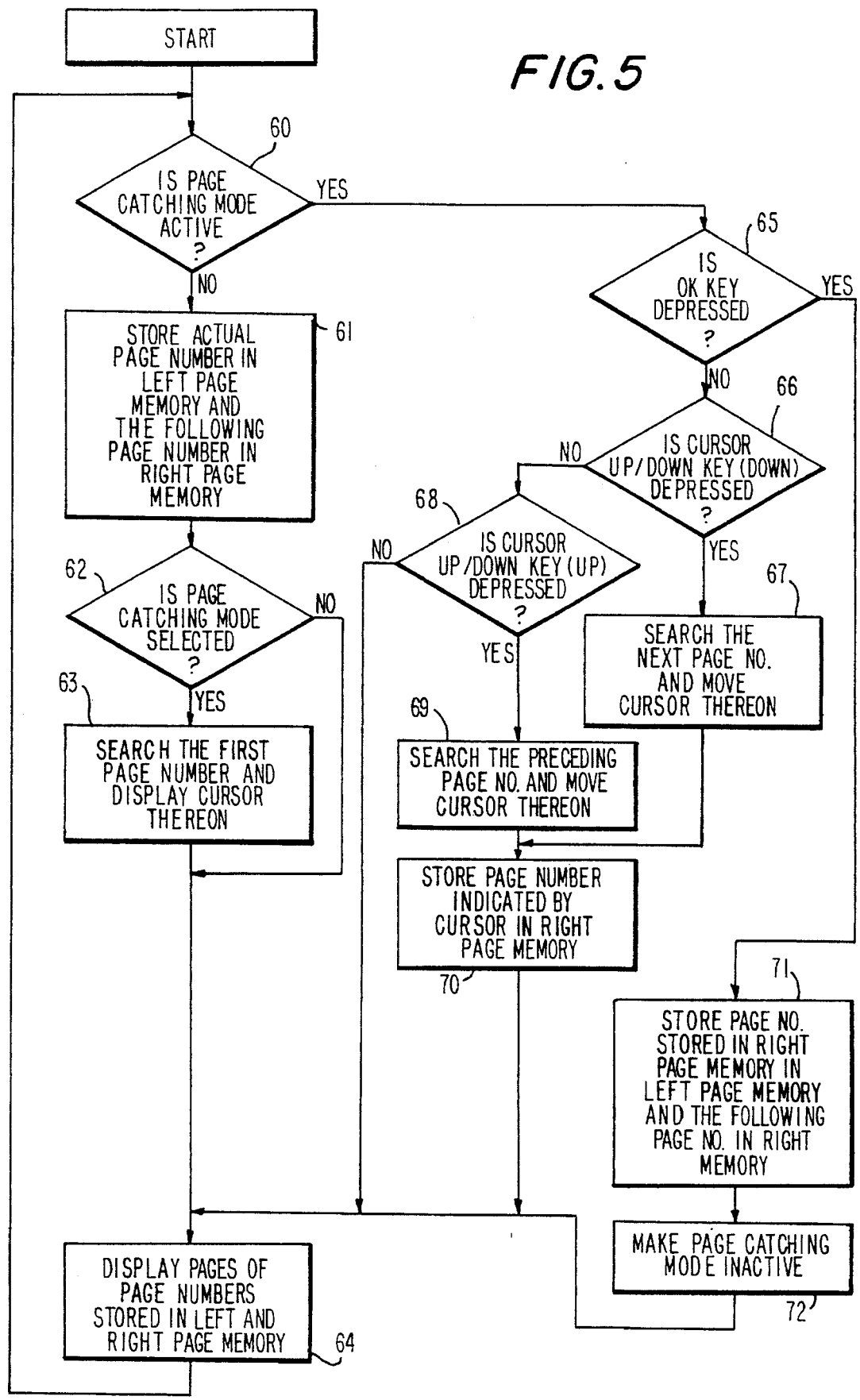

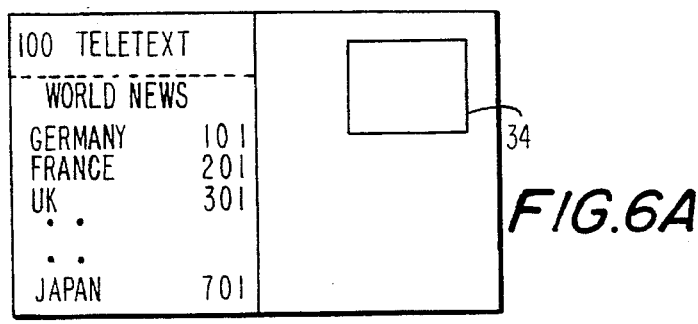
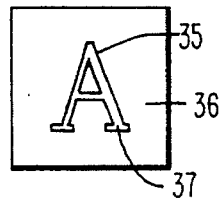
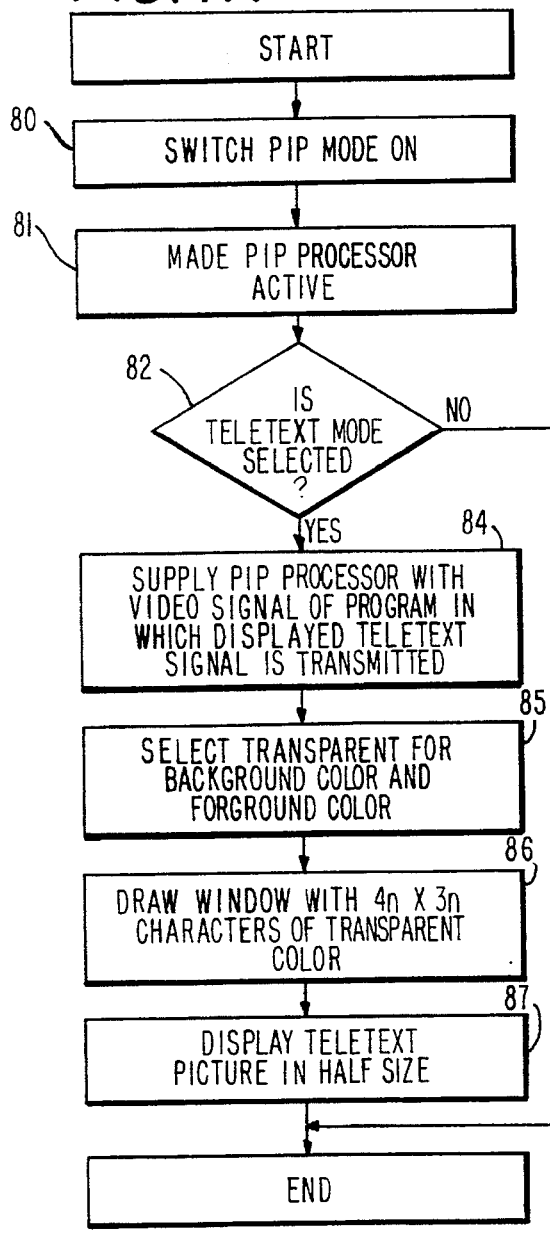
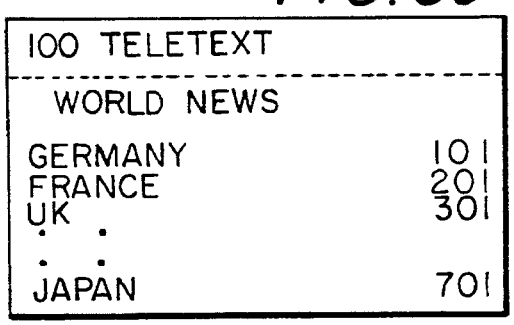
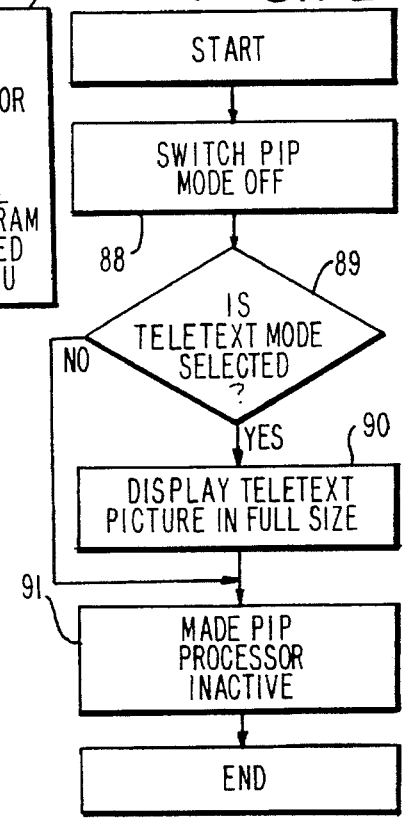

TELETEXT RECEIVER

BACKGROUND OF THE INVENTION

This invention relates to a teletext receiver that is capable of displaying a teletext picture in an area that is essentially one half of the display screen and of displaying another teletext picture or a normal video picture in the remaining portion of the screen without having the two pictures overlap.

In a conventional teletext receiver like a television receiver, a teletext picture can be selectively displayed on a screen alone, or the teletext picture can be superimposed on a normal video picture. In both cases, the normal video picture either cannot be seen at all or cannot be seen sufficiently when the teletext picture is displayed.

In another conventional television receiver, the normal video picture is displayed as a main picture on a full screen and the teletext picture is displayed as a picture in picture (hereinafter PIP) in a small "window" provided in the main picture or vice versa as disclosed in JP-A-1 296 878, JP-A-1 296 879, JP-A-2 228 186 and European Patent EP-A-O 489 387, U.S. Pat. No. 5,023,721 and U.S. Pat. No. 5,128,766. If the teletext picture is displayed as a PIP, it is difficult to read the text of the teletext picture due to the small size of the PIP. On the other hand, if the teletext picture is displayed as the main picture, a part of the teletext picture is covered by the "window" which displays the normal video picture and some important information may be obliterated.

It is also known from JP-A-57-206 178, JP-A-61-105190, JP-A-61-193580 and JP-A-1-276977 to split the screen vertically or horizontally into two areas: one displaying the normal video picture and the other displaying the teletext picture by controlling the deflection system of the television receiver. However, the circuit construction of such a television receiver is complicated.

For teletext transmission, normally the teletext data representing more than one page of teletext are transmitted during the vertical blanking periods in a television channel. Therefore, in a conventional teletext receiver, it is possible to store teletext data of more than one page in a teletext memory by assigning certain pages to be stored and to display more than one teletext picture on the screen at the same time by dividing the screen into more than one area as disclosed in JP-A-61-105190, JP-A-1-296878 and JP-A-1-296879. However, if the display area of the screen is split in four, for example, the size of each picture becomes too small to read.

SUMMARY OF THE INVENTION

The present invention overcomes the above described drawbacks. A teletext picture is displayed in about one half the area of the full display screen and a normal video picture or another teletext picture is displayed in the other half area of the full screen. Therefore, the two teletext pictures or the teletext picture and the normal video picture do not overlap with each other. Furthermore, the teletext picture in the half display screen is large enough to be read easily from normal viewing distances. In this invention, teletext data to be displayed in a half area of the display screen is read out from a memory at twice the speed of teletext data that otherwise would be displayed on a full screen.

BRIEF DESCRIPTION OF THE DRAWINGS

FIG. 2 is a schematic plan view of a remote control device employed for controlling the television receiver shown in FIG. 1;

FIGS. 3A, 3B, 3C and 3D are schematic diagrams useful in explaining a dual page mode and a combination of the dual page mode and a so-called page catching mode in an embodiment of a teletext receiver in accordance with the invention;

FIG. 5 is a flow chart explaining the combination of the dual page mode and the page catching mode shown in FIGS. 3A to 3D;

FIGS. 6A, 6B and 6C are schematic diagrams showing the PIP mode with teletext in an embodiment of a teletext receiver in accordance with the invention; and FIGS. 7A and 7B are flow charts useful in explaining the PIP mode as shown in FIGS. 6A to 6C.

DETAILED DESCRIPTION OF THE PREFERRED EMBODIMENTS

Figure 1:
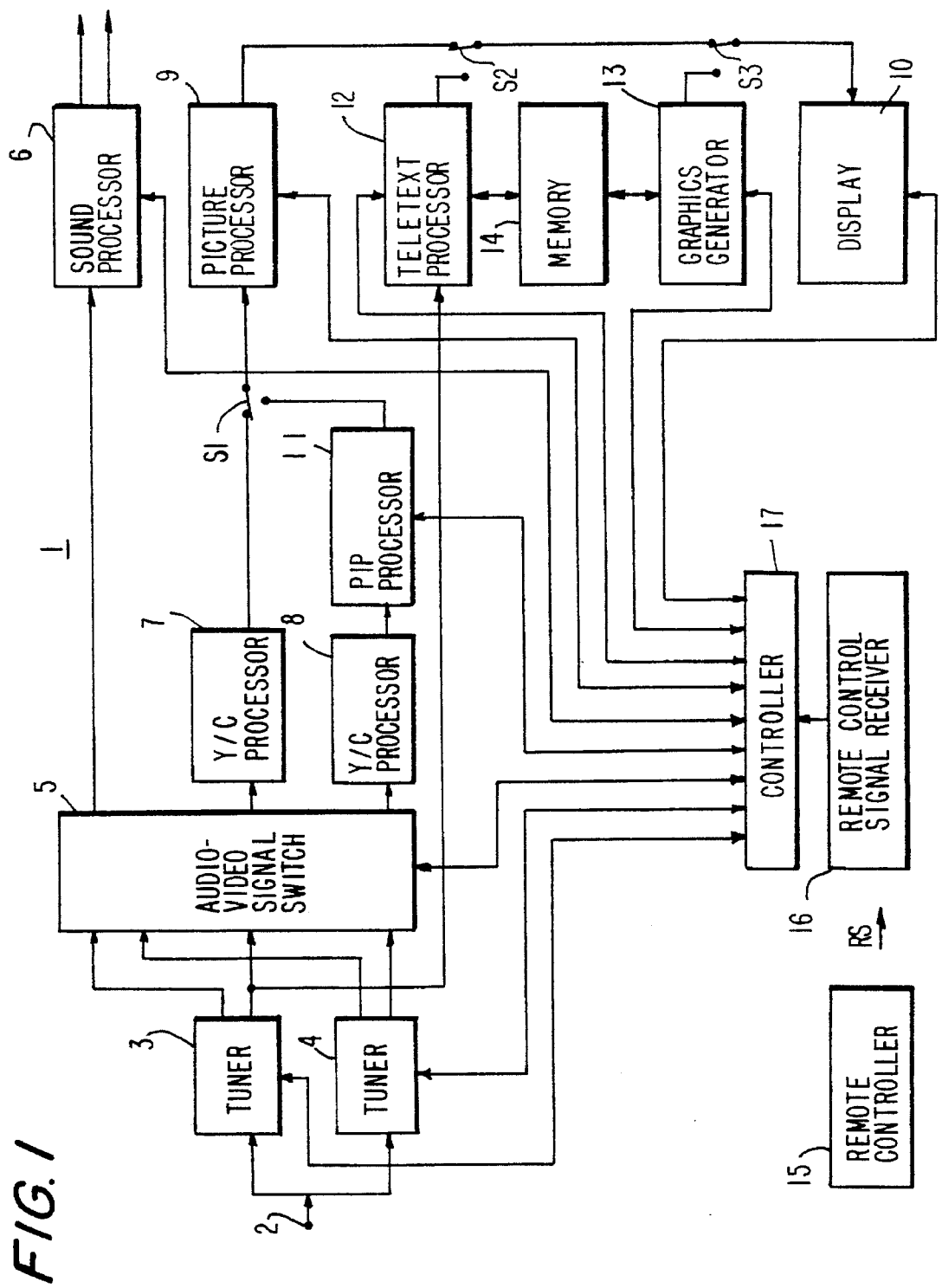
FIG. 1 is a schematic block diagram showing a television receiver used as a teletext receiver in accordance with the present invention.

Referring to FIG. 1, the construction of the television receiver (hereinafter, TV receiver) 1 used as a teletext receiver in accordance with the present invention is now explained. The TV receiver 1 has an antenna input 2, which is connected to tuners 3 and 4. Each tuner includes a video IF signal demodulator and an audio signal demodulator in order to obtain composite video signals and audio signals, respectively. These two tuners 3 and 4 are connected to an audio-video signal switcher (hereinafter, AV switcher) 5. Although not illustrated, auxiliary audio and video signal inputs (hereinafter, AV inputs) and auxiliary audio and video outputs (hereinafter, AV outputs) may be provided for selection by the AV switcher 5.

AV switcher 5 supplies one or more audio signals to a sound signal processor 6, which sets the received audio signals to a desired volume, tone and balance. The sound signal processor then supplies the audio signals to built-in speakers or headphones through power amplifiers (not illustrated).

One or more composite video signals selected by the AV switcher 5 are supplied to respective luminance and chrominance signal processors (hereinafter, Y/C processors) 7 and 8, which convert the respective composite video signals into respective luminance and color difference signals (for each, hereinafter, Y/U/V signal). A composite video signal which is selected by the AV switcher 5 to be displayed as the main-picture in the normal mode or in the PIP mode is supplied through the Y/C processor 7 and a fast switch S1 to a picture processor 9, which adjusts the picture quality of the Y/U/V signals. For instance, the picture processor 9 may adjust the Y/U/V signal in terms of its sharpness, picture contrast, brightness, color intensity or hue in case of the NTSC system. The picture processor then supplies the video picture signal in RGB form through fast switches S2 and S3 to display apparatus 10.

If the PIP mode is selected, a composite video signal selected by the AV switcher 5 to be displayed as the sub-picture in the PIP mode is supplied through the Y/C processor 8 to the PIP processor 11. The PIP processor then compresses the video signal in size to form the sub-picture. The main picture signal and the compressed sub-picture signal are selectively supplied through the fast switch S1 to the picture signal processor 9 under control of a blanking signal accompanying the sub-picture signal.

The composite video signal selected for the main picture by the AV switcher 5 is also supplied to a teletext processor 12. Teletext processor 12 extracts the teletext data signal which is transmitted during every vertical period of the television signal. Teletext processor 12 then forms the teletext picture signal in RGB form according to the extracted teletext data. The teletext picture signal is then selectively supplied through the fast switch S2, which is under the control of an accompanying blanking signal. The teletext picture signal then is supplied through the fast switch S3 to the display apparatus 10.

If the TV receiver 1 has an On Screen Display function (hereinafter, OSD), which provides the user with easy control, a graphics generator 13 generates the OSD picture signal in RGB form for display to a user who then may use the OSD information for control of the functions of the TV receiver 1. The OSD picture signal is selectively supplied through the fast switch S3 to the display apparatus 10 under the control of a blanking signal accompanying the OSD picture signal.

The blanking signals accompanying the respective picture signals control the fast switches S1, S2 and S3 according to the contents of the pictures so that, in general, the main video picture is displayed as a background, the sub-picture is displayed in the PIP mode, and the teletext picture and the OSD picture are overlayed in this order.

A memory 14 is adapted to store the teletext data and OSD data. The teletext processor 12, graphics generator 13, and memory 14 may be construed as an integrated circuit. Furthermore, as a Variation, the teletext picture and OSD picture can be produced by the same device and, as a result, the teletext processor 12 is used also as the graphics generator 13 and the fast switch S3 can be omitted.

The TV receiver 1 may be provided with a remote control unit (remote controller) 15 adapted to control the TV receiver by manipulation thereof. In that case, the TV receiver 1 includes a remote control signal receiver 16 for receiving control signals RS from the remote controller 15. Signal receiver 16 then decodes signal RS and supplies the decoded signal RS to a controller 17 for generally controlling the TV receiver 1. The controller may be embodied as a micro processor.

With respect to FIG. 2, the remote controller 15 has a TV power ON key 20, a teletext ON key 21, number keys 22, PIP mode selection keys 23, 24 and 25, a channel up/down key 26, a volume control key 27, a menu ON key 28, a cursor up/down key 29, an OK key 30, a return key 31, and a page catching mode key (indicated as P.C.) 32. Instead of the page catching key 32, the OK key 30 can be used to select the page catching mode and the page catching mode key 32 thus can be omitted. The remote controller 15 may have other function keys which are not directly related to the invention; therefore, for simplification, illustration and explanation of such function keys are omitted.

If the TV receiver 1 is in its stand-by condition, power is turned on when the TV power ON key 20 is depressed, and the display apparatus 10 is set to the channel which had been selected prior to the TV receiver 1 being turned off. A desired channel can be selected by depressing the number keys 22 or the channel up/down key 26. If the menu ON key 28 is depressed, a menu accompanied by a cursor is displayed on the screen as an OSD overlapped on the main picture, and the operation of the cursor up/down key 29 causes movement of the cursor on the menu. Depressing the OK key 30 selects a desired single item pointed to by the cursor. The selection of the item may cause actual control of the TV receiver 1 or may result in a particular display or in another menu. The return key 31 is used for a one-step back display of the menu layer, the location of the cursor or the like.

When an operator depresses the PIP mode selection key 23, a sub-picture is displayed as being overlapped on the main picture. By depressing the PIP mode selection key 24, the main picture and the sub-picture can be exchanged. By depressing the PIP mode selection key 25, the display position of the sub-picture can be shifted clock-wise. The program to be displayed as the sub-picture can be selected from a predetermined menu.

If the teletext key 21 is depressed when the display apparatus is displaying the main video picture that has been transmitted as the selected program, the teletext mode is selected and the teletext picture corresponding to the teletext data transmitted with the selected program is displayed instead of the main video picture. If the teletext key 21 is depressed again, the superimposed teletext picture is displayed together with the main video picture. In the teletext mode, any desired page of the teletext data can be selected by entering the page number with the number keys 22. Incrementing or decrementing of the page number is performed by manipulating the channel up/down key 26. After a teletext picture is displayed, teletext data of, for example, around 100 pages in total preceding and succeeding the presently displayed teletext page, may be stored in the teletext memory 14. Accordingly, if another page of teletext data which is stored in the teletext memory 14 is selected, the selected page is displayed quickly.

Additionally, the TV apparatus 1 is provided with a well-known so-called page catching function for easy teletext operation. When an operator depresses the page catching key 32 during the teletext mode, a cursor appears on the teletext picture presently displayed. The cursor is located at the first or top one of the page numbers indicated in the teletext picture, assuming that the teletext picture includes at least one index page. By manipulating the cursor up/down key 29, the cursor moves upwardly or downwardly to stop at each page number sequentially according to the rules described below and as illustrated in FIGS. 3A–3D. If the OK key 30 is depressed when the cursor is located at the desired page number, the teletext picture corresponding to that desired page number is then displayed.

Page numbers are detected on the basis of, e.g., a standard that the page number always consists of three digits and the first digit ranges from 1 to 8 only. While such three digits sometimes do not represent a page number, the user can easily recognize that and move the cursor to the next three digits. Nevertheless, in order to avoid such confusion, it may be additionally defined as a standard that three digits should be located at the beginning of the lines or are to be followed or preceded by predetermined symbols or characters, such as, ". ", "–", "/", (". "), "p", "S" and so on possibly with a space.

Teletext data of respective pages are transmitted cyclically every respective predetermined time period. Therefore, all page numbers of the teletext transmitted with a selected program can be detected within some maximum time period. If any of the three digits detected in accordance with the above standards are not found as detected page numbers, that set of three digits can be ignored.

As more details will be described below, teletext data corresponding to all of the pages whose numbers are indicated in the presently displayed teletext picture are automatically acquired by adopting the above described standards and such pages are stored in the teletext memory 14 in addition to the transaction for acquisition of teletext data of around 1200 pages as described above. This transaction may always be performed if the teletext picture is displayed, whether or not the page catching mode is selected, so that the selected page in the page catching mode can be displayed quickly.

Depressing the menu ON key 28 during the teletext mode causes a teletext menu related to teletext operation to appear on display 10 as overlapping the presently displayed teletext picture. Several features for teletext display, such as index, selection of enlarged upper half/enlarged lower half/normal size full page display, subtitle and so on can be selected by manipulating the cursor up/down key 29 and subsequently depressing the OK key 30.

According to one embodiment of the invention, a dual page mode is provided. If the dual page mode is selected from the teletext menu during the teletext mode, two consecutive pages of teletext pictures are displayed simultaneously on the screen, compressed in the horizontal or vertical direction, such as shown in FIG. 3A. The two consecutive pages of teletext pictures which are desired can be selected in the same manner as described above. To realize the dual page mode, the teletext data is read from the teletext memory 14 twice as fast as when a teletext picture that is to be displayed as the full display 10 is read from teletext memory 14.

In this embodiment, the dual page mode can be combined with the page catching mode, the later having been described above. At the outset, all teletext data corresponding to the pages whose numbers are indicated in the displayed teletext picture, for example, on the left hand side on the screen, are acquired automatically and stored in the teletext memory 14 in the same manner as described above, whether or not the page catching mode is selected.

Figure 4:
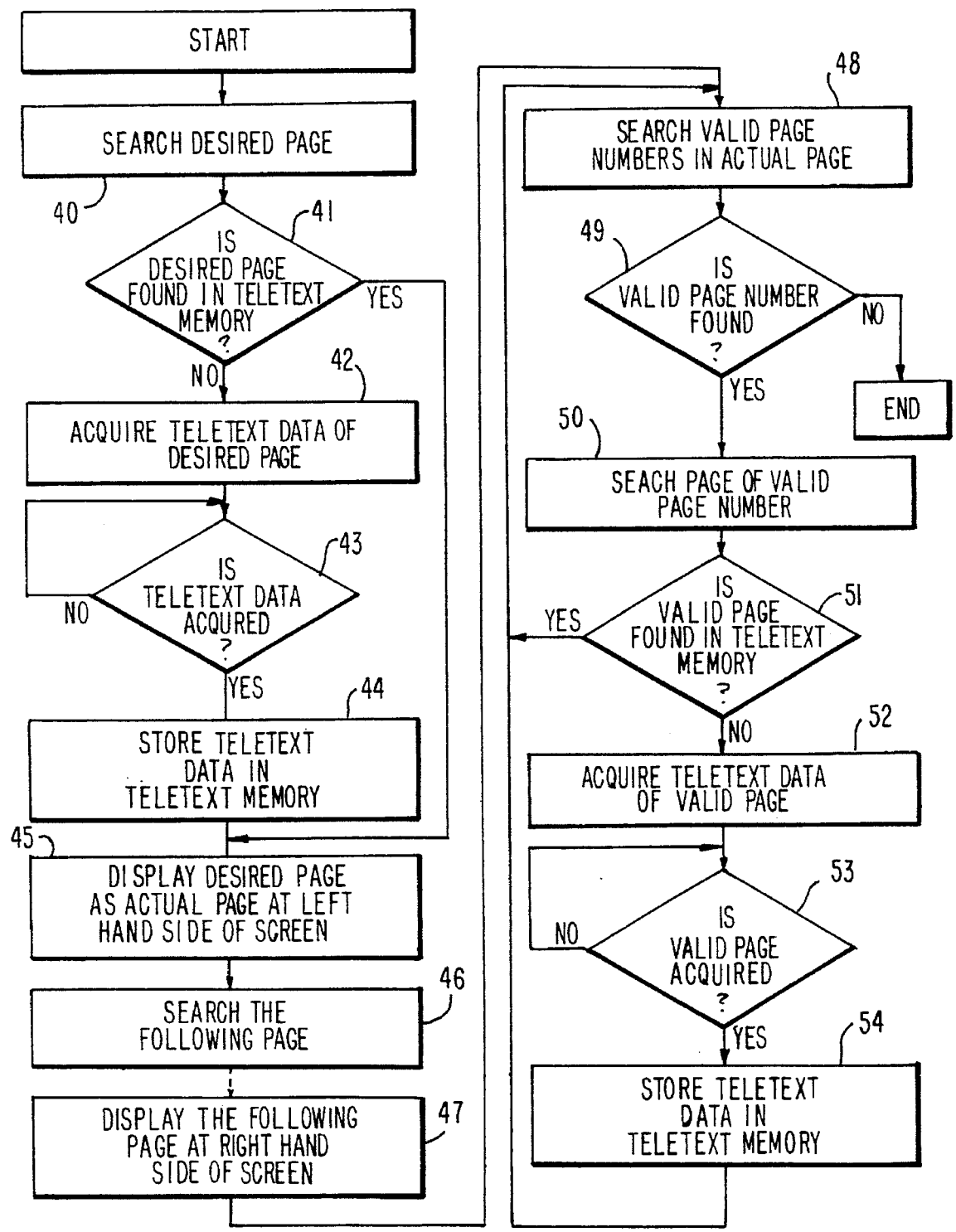
FIG. 4 is a flow chart for explaining page acquisition for the page catching mode in an embodiment of a teletext receiver in accordance with the invention.

Referring to FIG. 4, the transaction of the dual page mode and the acquisition of teletext data used in the page catching mode now will be explained in detail. In the dual page mode, if the user selects a desired teletext page by the number keys 22 or the channel up/down key 26, the desired page is searched, as represented by step 40, to determine if the teletext data of the desired page has already been stored in the teletext memory 14, as indicated by inquiry 41. If not, the teletext data of the desired page is acquired from the teletext data signal transmitted with the selected program as represented by step 42. If the teletext data of the desired page is acquired, as represented by inquiry 43 being answered in the affirmative, the teletext data is stored in the teletext memory 14, as shown by step 44. The teletext picture of the desired page is displayed, for example, on the left hand side of the display 10, as hereinafter called "actual page" as indicated by step 45

Subsequently, the page following the desired page is searched, as shown in step 46. After procedures similar to steps 41 and 44 are taken with regard to the following page, the teletext picture of the following page is displayed on the right hand side of the display 10, as represented by step 47. If the page following the desired page is not found during these procedures, the nearest subsequent page is searched and displayed.

If the teletext picture of the actual page is displayed, valid page numbers are searched from the text of the actual page, as indicated by step 48. If the first valid page number is found, that is, if inquiry 49 is answered in the affirmative, then teletext memory 14 is searched in step 50 to see if the teletext data of the first valid page is stored therein. If the teletext data is not stored in the teletext memory 14, as represented by a negative answer to inquiry 51, the teletext data of the valid page is acquired from the teletext data signal transmitted with the selected program, as represented by step 52. Inquiry 53 determines if a valid page has been acquired, and if so, the teletext data is stored in the teletext memory 14, as shown by step 54. The routine then returns to step 48 and the following valid page numbers are searched and their corresponding teletext data are stored in the memory 14 sequentially by repeating steps 48 to 54 until no further page number is found.

Referring to FIGS. 3A to 3D and FIG. 5, operation of the dual page mode in combination with the page catching mode, now will be explained. In the teletext memory 14, two memory areas are assigned for left page numbers and right page numbers, respectively. If it is determined in inquiry 60 that the page catching mode is not active, the page number of the actual page is stored in the memory area for the left page numbers and the page number following this page number of the actual page is stored in the memory area for right page numbers, as represented by step 61. If it is determined in inquiry 62 that the page catching mode is not selected, the teletext pictures of the actual page and the following page are displayed on the left hand side and the right hand side of the display 10, respectively, as indicated by step 64, as explained above and as shown in FIG. 3A.

If inquiry 62 indicates that the page catching mode is selected, as by depressing the page catching key 32 or the OK key 30, the page catching function becomes active and the first valid page number indicated in the teletext picture displayed as the actual page at the left hand side of the screen is searched in a sequence similar to that explained above and shown in FIG. 4. If the first valid page number is found, a cursor 33 appears and is located on the first valid page number, as shown in FIG. 3B and as represented by step 63.

If the OK key is not depressed but the cursor up/down key 29 is manipulated to move the cursor 33 downward, inquiry 65 is answered in the negative and inquiry 66 is answered in the affirmative; and the next valid page number is searched and the cursor 33 is moved to the next valid page number, as indicated by step 67. Similarly, if the cursor up/down key 39 is manipulated to move the cursor 33 upwardly, inquiry 66 is answered in the negative and inquiry 68 is answered in the affirmative. The preceding valid page number is searched and the cursor 33 is moved to the preceding valid page number as represented by step 69. Since these valid page numbers have been searched once in the previous procedure shown in FIG. 4, if the locations of these valid page numbers in the actual page have been stored, it is not always necessary to search them again.

If the cursor 33 now is located on any valid page number, this valid page number is stored in the memory area for right page numbers, as represented by step 70; and the teletext data of this valid page number is read from the teletext memory 14 so that the teletext picture of this page is displayed on the right hand side of the screen as shown in FIGS. 3B or 3C. Therefore, the user can preview the teletext picture to check whether this page is really the desired one.

If the teletext picture displayed in the right hand side of the screen is the desired one, then the operator depresses OK key and inquiry 65 is answered in the affirmative. This page number is then stored in the memory area for the left page numbers, and the following page number is stored in the memory area for the right page numbers, as shown in step 71. Step 72 makes the page catching mode inactive and subsequently, the teletext data of those two page numbers are read from the teletext memory 14 so that the teletext pictures of these two pages are displayed by step 64 and shown in FIG. 3D.

Referring to FIGS. 6A, 6B and 6C and FIGS. 7A and 7B, the PIP mode with teletext is now explained. If the PIP mode selection key 23 is depressed, as in step 80 of FIG. 7A, the routine advances to step 81 to activate the PIP processor 11. Then, if the teletext mode is not selected, inquiry 82 is answered in the negative, and the video signal of the program selected for a sub-picture by means of the menu is supplied through the AV switcher 5 to the PIP processor 11 so that the sub-picture is displayed on the screen together with the main picture also selected by the AV switcher 5, as represented by step 83.

However, if the teletext mode is selected, inquiry 82 is answered in the affirmative, but the sub-picture cannot be seen sufficiently because the teletext picture has priority over the sub-picture of PIP. Therefore, in this embodiment, the teletext data is read from the teletext memory 14 at double the speed of full size teletext picture display. Then, for example, the teletext picture is displayed in the left hand side of the screen which is half the size of the full screen. The blanking signal is derived during scanning, for example, for the remaining right hand side of the screen to produce a blank picture, in which a window 34 is produced to recover the sub-picture so that the sub-picture is displayed in the remaining half of the screen as shown in FIG. 6A. Similar considerations apply generally in respect to a horizontally half size displaying.

One solution to make such a window 34 is to generate in the teletext processor 12 4n×3n characters (in case of a 4:3 aspect ratio where n is related to the magnification of the sub-picture) with transparent color at the location corresponding to where the sub-picture is to be displayed in the teletext picture layer or also in the OSD picture layer, if the OSD picture layer is separately displayed. More precisely, each character 35 is surrounded by a rectangular, so-called background 36 as shown in FIG. 6B and the transparent color is selected to paint both of the background 36 and the inside of the character, i.e., a so-called foreground 37. Although character "A" is shown in FIG. 6B as an example, any character or symbol can be used, of course, and if a transparent color is assigned for such respective characters, then only the background color is important.

Accordingly, if inquiry 82 is answered in the affirmative, that is, if the teletext mode has been selected before the PIP mode is selected, then the program that includes the transmitted video signal along with the teletext picture is supplied to the PIP processor 11, as represented by step 84 in order to avoid a misunderstanding, though it is a matter of choice. In step 85, the transparent color is selected for both the background and the foreground to be written and the window is formed of 4n×3n characters in transparent color as indicated by step 86. Subsequently, the teletext picture is displayed at the left hand side in half size as represented by step 87.

If the PIP mode is made inactive by depressing the PIP mode selection key 23 again, as shown in step 88, the PIP processor 11 is made inactive in step 91 whether or not the teletext mode is selected. If the teletext mode had been selected, as indicated by an affirmative answer to inquiry 89, the routine advances to step 90 whereby the teletext picture displayed at the left hand side in half size is displayed in full size of the screen as shown in FIG. 6C by reading out from memory 14 at normal speed.

What is claimed is:

1. A teletext receiver comprising:

means for receiving a composite video signal, said composite video signal further including teletext data;

teletext processor means, in communication with said means for receiving, for obtaining from said received composite video signal said teletext data and for generating from said obtained teletext data a plurality of teletext pages;

teletext memory means, in communication with said teletext processor means, for storing said generated plurality of teletext pages; and display means, in communication with said teletext processor means, operable in a first mode for selectively displaying on the entirety of the display means a teletext page read from said teletext memory means at a first speed and operable in a second mode for simultaneously displaying in one half of said display means a first teletext page in its entirety read from said teletext memory means at a second speed higher than said first speed and in another half of said display means a second teletext page in its entirety read from said teletext memory means at said second speed such that said first teletext page and said second teletext page are displayed adjacent to each other and do not overlap with each other.

2. A teletext receiver as claimed in claim 1 in which said first teletext page corresponds to a first selected page and said second teletext page corresponds to a second selected page.

3. A teletext receiver comprising:

means for receiving a composite video signal, said composite video signal including a teletext data portion and a video portion;

teletext processor means, in communication with said means for receiving, for obtaining from said received composite video signal said teletext data portion and for generating from said obtained teletext data portion a plurality of teletext pages;

teletext memory means, in communication with said teletext processor means, for storing said generated plurality of teletext pages;

PIP processor means, in communication with said means for receiving, for processing said video portion of said composite video signal to form a sub-picture that includes said processed video portion;

display means, in communication with said teletext processor means and said PIP processor means, operable in a first mode for selectively displaying on the entirety of the display means a teletext page read from said teletext memory means at a first speed and operable in a second mode for simultaneously displaying in a first display position located in one half of said display means a selected teletext page in its entirety read from said teletext memory means at a second speed higher than said first speed and displaying said sub-picture in a window in a second display position located in said other half of said display means such that said selected teletext page and said sub-picture do not overlap with each other, said window being smaller in size than said displayed teletext page.

4. The teletext receiver of claim 3, wherein said display means is capable of shifting said second display position of said window independently of said first display position of said displayed teletext page.

\* \* \* \* \*